US012489671B2

(12) United States Patent
Sedouram

(10) Patent No.: US 12,489,671 B2
(45) Date of Patent: Dec. 2, 2025

(54) CONTENT CONTAINER INTEGRATION WITH SYSTEM EVENTS

(71) Applicant: Google LLC, Mountain View, CA (US)

(72) Inventor: Ramprasad Sedouram, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 434 days.

(21) Appl. No.: 17/872,397

(22) Filed: Jul. 25, 2022

(65) Prior Publication Data

US 2023/0396489 A1    Dec. 7, 2023

(30) Foreign Application Priority Data

Jun. 6, 2022   (IN) .............................. 202221032294

(51) Int. Cl.
  *H04L 41/069*    (2022.01)
  *G06F 3/16*      (2006.01)
  *H04L 9/40*      (2022.01)
  *H04L 41/22*     (2022.01)
  *H04L 41/28*     (2022.01)

(52) U.S. Cl.
  CPC .............. *H04L 41/069* (2013.01); *G06F 3/16* (2013.01); *H04L 41/22* (2013.01); *H04L 41/28* (2013.01); *H04L 63/1416* (2013.01)

(58) Field of Classification Search
  CPC ......... G06F 3/16; G06F 3/165; H04L 41/069; H04L 41/145; H04L 41/22; H04L 41/28; H04L 63/1416
  See application file for complete search history.

(56) References Cited

U.S. PATENT DOCUMENTS

| | | | |
|---|---|---|---|
| 2018/0075493 A1 | 3/2018 | Agarwal et al. | |
| 2019/0354341 A1* | 11/2019 | Stahl | ........................ G10L 25/21 |
| 2020/0413141 A1* | 12/2020 | Loheide | ............. H04N 21/8456 |
| 2022/0094731 A1* | 3/2022 | Noorkami | .......... H04N 21/2343 |

OTHER PUBLICATIONS

Kateliev, "How to disable the annoying Secure Wi-Fi on the Samsung Galaxy S10", https://www.phonearena.com/news/disable-secure-wi-fi-notification-samsung-galaxy_id115189, Jul. 6, 2020, retrieved on Aug. 23, 2022, 17 pages.

* cited by examiner

*Primary Examiner* — Gil H. Lee
(74) *Attorney, Agent, or Firm* — DORITY & MANNING P.A.

(57) ABSTRACT

Example aspects of embodiments of the present disclosure can provide for an example networked device for securely rendering distributed network resources, the networked device including one or more processors and one or more non-transitory, computer-readable media storing instructions executable to cause the one or more processors to perform operations. In some examples, the operations can include determining an occurrence of a system-level event on the networked device; responsive to determining the occurrence of the system-level event, executing, in a secure container, a request generation routine to generate a request for distributed content related to the system-level event; transmitting, using a network connection, the request; receiving, responsive to the request and using the network connection, a distributed content item; and rendering the distributed content item.

20 Claims, 5 Drawing Sheets

CONTENT CONTAINER INTEGRATION WITH SYSTEM EVENTS

RELATED APPLICATIONS

The present application claims the benefit of and priority to Indian Provisional Application No. 202221032294, filed Jun. 6, 2022. Indian Provisional Application No. 202221032294 is hereby incorporated by reference herein in its entirety.

FIELD

The present disclosure relates generally to rendering content in association with system events. More particularly, the present disclosure relates to rendering content in a content container by a system device in association with system events.

BACKGROUND

Various devices can generate notifications of system events. These notifications can communicate data indicative of the system event. The notifications can be rendered graphically, audibly, with tactile sensations, etc.

SUMMARY

Aspects and advantages of embodiments of the present disclosure will be set forth in part in the following description, or can be learned from the description, or can be learned through practice of the embodiments.

One example aspect of the present disclosure is directed to an example networked device for securely rendering distributed network resources. The example network device can include one or more processors and one or more non-transitory, computer-readable media storing instructions executable to cause the one or more processors to perform operations. In the example networked device, the operations can include determining an occurrence of a system-level event on the networked device. In the example networked device, the operations can include, responsive to determining the occurrence of the system-level event, executing, in a secure container, a request generation routine to generate a request for distributed content related to the system-level event. In the example networked device, the operations can include transmitting, using a network connection, the request. In the example networked device, the operations can include receiving, responsive to the request and using the network connection, a distributed content item. In the example networked device, the operations can include rendering the distributed content item.

Another example aspect of the present disclosure is directed to an example computer-implemented method for securely rendering distributed network resources. The example method can include determining, by a computing system having one or more processors, an occurrence of a system-level event on the networked device. The example method can include executing, by the computing system, in a secure container, and responsive to determining the occurrence of the system-level event, a request generation routine to generate a request for distributed content related to the system-level event. The example method can include transmitting, by the computing system and using a network connection, the request. The example method can include receiving, by the computing system, using the network connection, and responsive to the request, a distributed content item. The example method can include rendering, by the computing system, the distributed content item.

Another example aspect of the present disclosure is directed to an example computing system for securely rendering distributed network resources. The example computing system can include one or more processors and one or more non-transitory, computer-readable media storing instructions executable to cause the one or more processors to perform operations. In the example computing system, the operations can include receiving a request for a distributed content item, the request generated within a secure container of a client device. In the example computing system, the operations can include determining, based on the request, a type of event associated with the request. In the example computing system, the operations can include determining, based on the type of event, a distributed content item. In the example computing system, the operations can include outputting the distributed content item for rendering on the client device.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
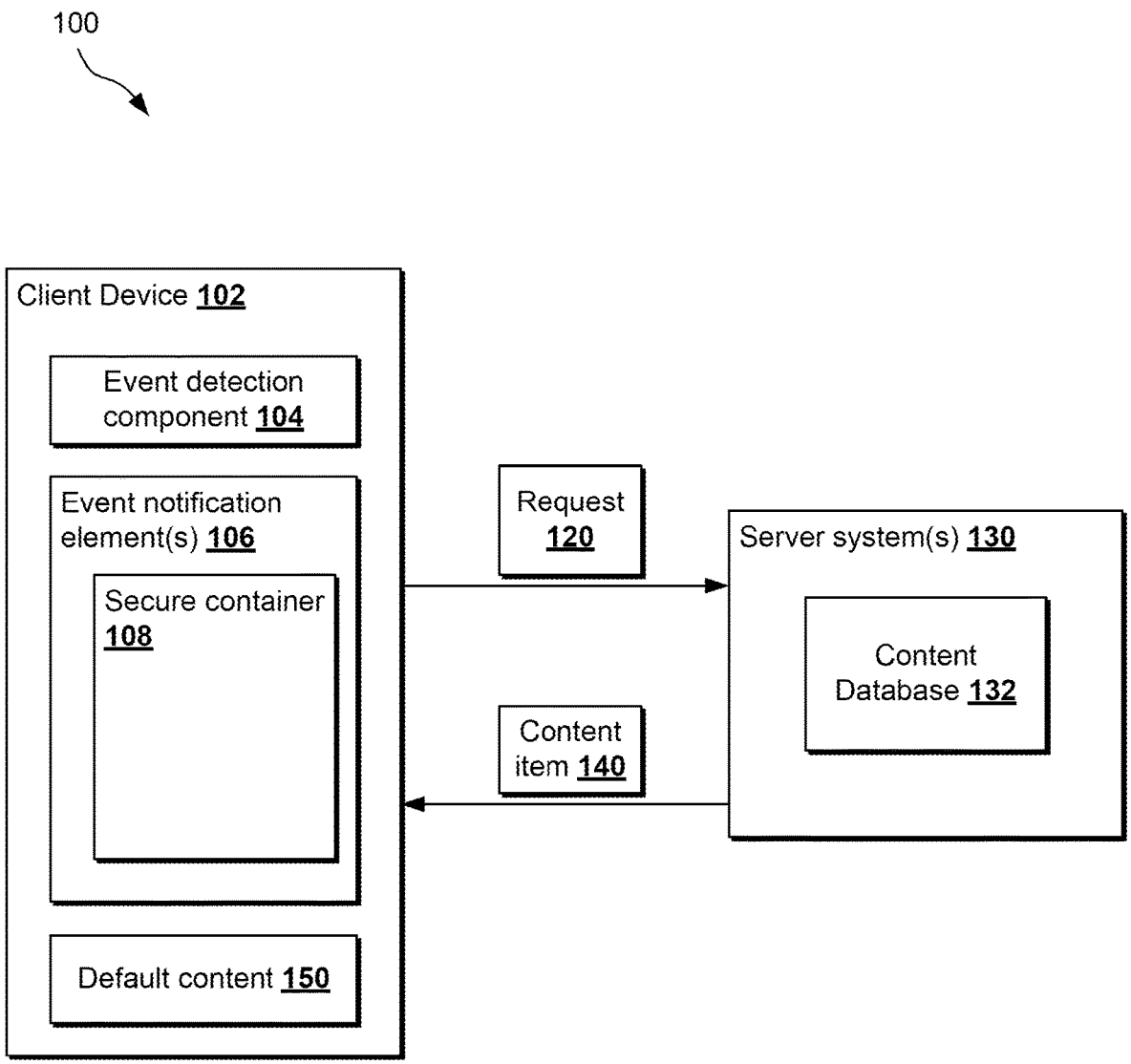
FIG. 1 depicts a block diagram of an example computing system that can perform content retrieval and integration according to example embodiments of the present disclosure.

Reference numerals that are repeated across plural figures are intended to identify the same features in various implementations.

DETAILED DESCRIPTION

Overview

Example embodiments of the present disclosure relate to rendering content on a networked device in association with system-level events and outputs. For example, example aspects relate to routing distributed content for display in a content container integrated with one or more systems of the networked device. For example, in some embodiments, a networked device can be configured to generate graphical, tactile, or audible signals of system events, such as a battery state, a network connection state, changes thereof, etc. Such signals can be supplemented or replaced by content distributed over the network, optionally distributed in real-time with occurrence of an event triggering the signal. In this manner, for instance, example embodiments of the present disclosure can provide for richer contextual content rendered in association with system events.

Additionally, example embodiments of the present disclosure relate to integrating content rendering containers with an operating system of a networked device for securely retrieving, packaging, and rendering distributed content from third-party providers. For example, in some embodiments, it may be desired to render distributed content in an integrated manner with system-level prompts, notifications, and other events. It may be desired to render such content while maintaining a secure barrier around system-level information, controls, and interfaces. For instance, in some embodiments, systems and methods according to the present disclosure can provide for secured content containers embedded within system interfaces in which distributed content can be rendered without exposing system-level information to the third party or granting control of the system interface to the third party.

In some embodiments, the distributed content can be routed to a networked device based on a relevance between the content and one or more events on the networked device. In some embodiments, the distributed content can be routed to the networked device for rendering to prompt, link, or otherwise guide a user to one or more additional networked resources related to a user's intent for using the networked device. For example, in some embodiments, a user's intent can be determined using one or more inputs to the networked device, and distributed content can be routed to the networked device in association with one or more system-level interactions to assist the user in realizing the user's intent.

Systems and methods according to the present disclosure can provide for a number of technical effects and benefits. For instance, example embodiments of the present disclosure can provide for secure integration of system-level content rendering containers, reducing information leakage while offering an improved system interface for consuming rendered content. Example embodiments of the present disclosure can also provide for distributed content rendered in closer association with system-level events, such that the user interface of the system can be improved by decreasing the processing resources used for a user to traverse an interface to obtain the same information. For example, example embodiments of the present disclosure can provide for decreased memory usage, decreased battery usage, decreased processing time, etc. Furthermore, by improving the user-machine interface, the capabilities of devices implementing systems and methods according to the present disclosure can be expanded upon and used in a more efficient and effective manner.

With reference now to the Figures, example embodiments of the present disclosure will be discussed in further detail.

Example Devices and Systems

FIG. 1 depicts a block diagram of an example system 100 for implementing example aspects of the present disclosure to securely provide content for rendering in association with system-level events.

For example, a client device 102 can include an event detection component 104. The event detection component 104 can generate one or more signals indicative of an event associated with the client device 102 (e.g., a system-level event). The client device 102 may be configured to render one or more event notification element(s) 106 in association with the event. In some embodiments, the event notification element(s) 106 can include a secure container 108. The client device 102 can send a quest 120 to a server system 130 (e.g., through a network interface) requesting content from a content database 132. The server system 130 can output a content item 140 based on the request 120 (and optionally other context) for rendering by the client device 102. In some embodiments, default content 150 can be rendered in addition to or instead of the content item 140 (e.g., as a backup option).

The event detection component 104, in some embodiments, can be in communication with, part of, or otherwise integrated with one or more other components of the client device 102. For instance, the client device 102 can be configured to access, control, and manage multiple hardware components, sensors, devices, etc. For instance, in some embodiments, the client device 102 can include one or more processors and a memory configured to execute an operating system. For instance, the client device 102 can be configured to execute one or more applications (e.g., user-facing applications, system-facing applications, etc.). In some embodiments, the event detection component 104 can be configured to detect events associated with any components on the hardware level, firmware level, or software level. For instance, events can be associated with a battery state (e.g., hardware voltage level, etc.) or a network connection state (e.g., facilitated by firmware controlling a network interface, software instructing the firmware, etc.) or an unread state of a received message (e.g., from messaging app software, etc.). Events can be associated with a peripheral connection state (e.g., headphones). In this manner, for instance, the event detection component 104 can generate signals associated with various states of various components of the client device 102. In some embodiments, the event detection component 104 is a discrete component (e.g., that polls various other components for status updates). In some embodiments, the event detection component 104 is distributed (e.g., integrated into the various component(s) for which it detects events). In some embodiments, the event detection component 104 can be or be implemented through an application programming interface (API).

The event notification element(s) 106, in some embodiments, can include one or multiple data structures for providing rendered interface(s) to a user of the client device 102. For example, in some embodiments, the event notification element(s) 106 can include one or more elements of a user interface configured to notify a user of a system event. For instance, in the context of a graphical user interface, an event notification element 106 can include a notification bubble, tray, card, etc. that is rendered on a display to notify (e.g., optionally using tactile or audible cues in coordination with or substitution for visual cues). For example, in some embodiments, an event notification element 106 can include a notification chime or other audible alert or signal configured to communicate the occurrence of an event. For example, in some embodiments, event notification element(s) 106 can include a push notification. In some embodiments, event notification element(s) 106 can include an user interface overlay. In some embodiments, event notification element(s) 106 can include an user interface card. In some embodiments, event notification element(s) 106 can include an announcement (e.g., verbal, text-to-speech, recorded, etc.).

In some embodiments, event notification element(s) 106 can include a secure container 108. The secure container 108 can be configured for presenting or otherwise rendering content in association with one or more system events. For instance, the secure container 108 can provide a sandboxed environment for requesting, downloading, and rendering content (e.g., third-party content). For instance, the secure container 108 can provide limited access to system event information. For instance, rendering content in association with system events can include acting on one or more trigger signals (e.g., from the event detection component(s) 104). However, it may be desired to restrict access to the system status information that gives rise to those trigger signals (e.g., hardware states, firmware states, software states, etc.). In this manner, for instance, the secure container 108 can restrict access between content executed from within the sandboxed environment and other system components and libraries. For instance, in some embodiments, the secure container 108 can be an iframe hosted on the device but configured to host content from a remote domain. For instance, the secure container 108 can include an API that provides limited data flow across a firewall. For instance, the secure container 108 can include a limited API that communicates with event detection component(s) 104, such that the secure container 108 can have access to trigger signals relating to the system event(s).

In some embodiments, the secure container 108 can include an API that provides, to the contents of the secure container 108, data descriptive of a type of a system event. For instance, a type of a system event can include, for example, a low battery event type, a network connectivity event type (e.g., no connectivity, successful connectivity, slow network speed(s), etc.), a new message event type, a battery charging event type, and the like. Based on the type of event, executable contents of the secure container 108 (e.g., scripts) can obtain content related to the type of system event.

A request 120, in some embodiments, can be generated by the client device 102 can be transmitted to server system(s) 130 to obtain content for rendering in association with a system event. For instance, in some embodiments, a request 120 can be generated by executable instructions running within the secure container 108. For instance, in some embodiments, the client device 102 can allow an executable script to be stored within secure container 108, such that when event notification element(s) 106 are executed or otherwise processed or called for rendering for a user, the executable script is likewise called within the secure container 108. The executable script can generate a request 120 to, in real-time, obtain content for rendering in association with the system event. In some embodiments, the request 120 can be a local request to retrieve locally-stored content pre-loaded for rendering in association with the system event.

In some embodiments, the request 120 can be indicative of context associated with the system event. For instance, in some embodiments, the request 120 can be based on a type of system event. In this manner, for instance, content can be retrieved that is relevant to the system event. In some embodiments, the request 120 can be indicative of context associated with a user account corresponding to the client device 102. For instance, in some embodiments, the request 120 can include a user account identifier (e.g., an obfuscation thereof, such as a hashed value, etc.). In this manner, for instance, responses to the request 120 can be personalized.

The server system(s) 130 can include, for example, one or more server computing devices (e.g., connected over a network). The server system(s) 130 can include a content database 132 from which a content item 140 can be retrieved for distribution to the client device 102. For instance, the server system(s) 130 can retrieve the content item 140 responsive to the request 120. In some embodiments, the server system(s) 130 can perform or otherwise engage in a real-time content selection process (e.g., based on bidding, relevance determinations, ranking, etc.).

The content item 140 can, in some embodiments, be substantially any type of content configured for rendering in association with the system event of the client device 102. For instance, the content item 140 can be rendered by the client device 102. In some examples, the content item 140 can be rendered on another device associated with the client device 102. For instance, the client device 102 can trigger rendering of the event notification element(s) 106 on one or more other devices (e.g., other networked devices associated with the client device 102, such as other devices on a local network, other devices associated with a user account common among the devices, etc.). For example, the content item 140 can be configured to render on a particular surface, determined by the client device 102 or the server system(s) 130, based on the request 120.

In some embodiments, the content item 140 can include third-party content. For instance, in some embodiments, the content item 140 can include content retrieved for rendering to provide notification of or access to (e.g., via hyperlinks, deep links, etc.) one or more third-party platforms, products, or services. For instance, in some embodiments, the event notification element(s) 106 can include native content (e.g., first-party content) rendered with a third-party content item 140. In some embodiments, the event notification element(s) 106 can include only third-party content item 140.

Figure 2A:
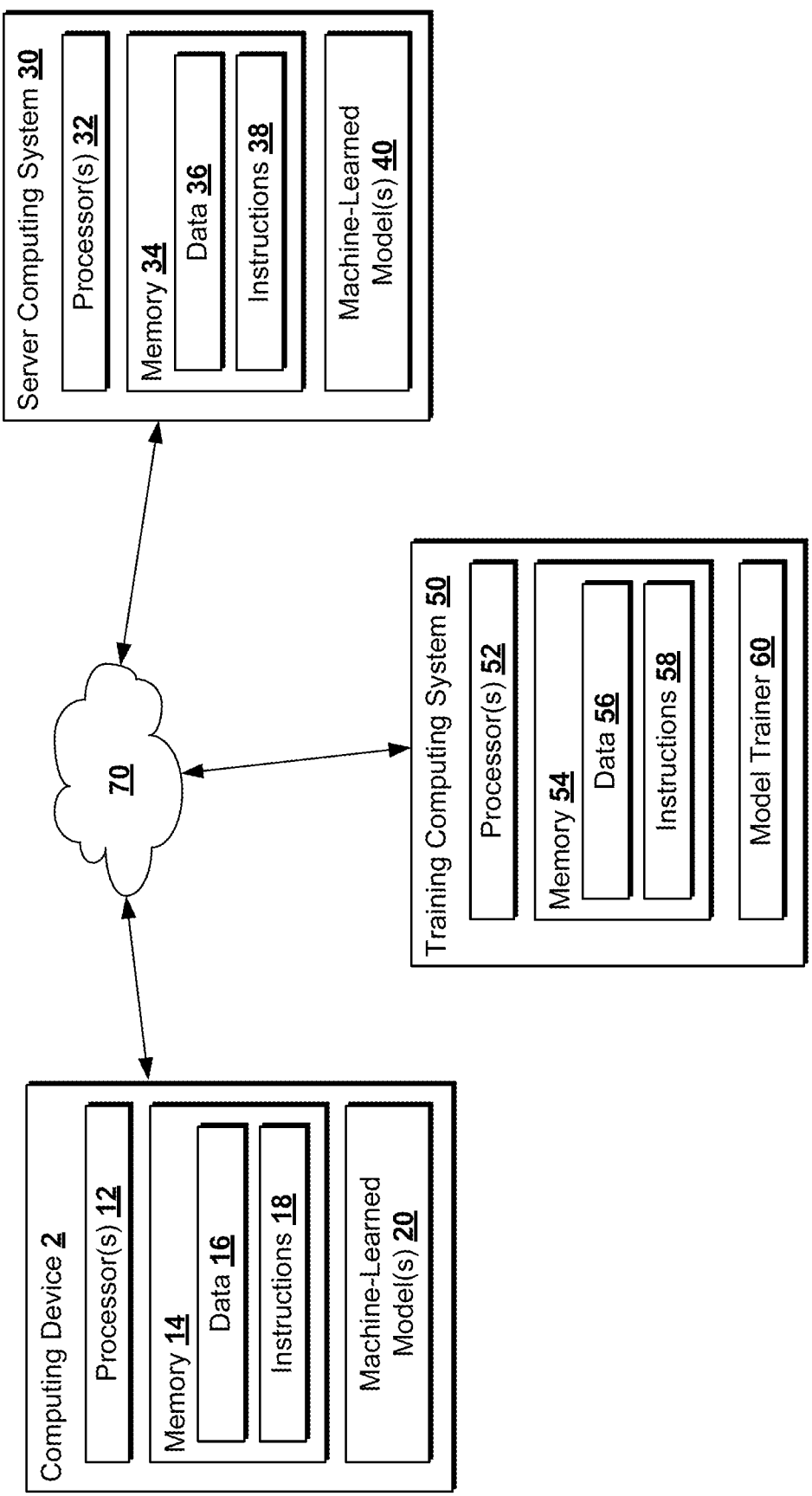
FIG. 2A depicts a block diagram of an example computing system that can perform content retrieval and integration according to example embodiments of the present disclosure.

FIG. 2A depicts a block diagram of an example computing system 1 that can perform according to example embodiments of the present disclosure. The system 1 includes a computing device 2, a server computing system 30, and a training computing system 50 that are communicatively coupled over a network 70.

The computing device 2 can be any type of computing device, such as, for example, a mobile computing device (e.g., smartphone or tablet), a personal computing device (e.g., laptop or desktop), a workstation, a cluster, a gaming console or controller, a wearable computing device, an embedded computing device, or any other type of computing device. In some embodiments, the computing device 2 can be a client computing device. The computing device 2 can include one or more processors 12 and a memory 14. The one or more processors 12 can be any suitable processing device (e.g., a processor core, a microprocessor, an ASIC, an FPGA, a controller, a microcontroller, etc.) and can be one processor or a plurality of processors that are operatively connected. The memory 14 can include one or more non-transitory computer-readable storage media, such as RAM, ROM, EEPROM, EPROM, flash memory devices, magnetic disks, etc., and combinations thereof. The memory 14 can store data 16 and instructions 18 which are executed by the processor 12 to cause the user computing device 2 to perform operations (e.g., to obtain or render content as described herein, etc.).

In some implementations, the user computing device 2 can store or include one or more machine-learned models 20. For example, the machine-learned models 20 can be or can otherwise include various machine-learned models such as neural networks (e.g., deep neural networks) or other types of machine-learned models, including non-linear models or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, one or more machine-learned models 20 can be received from the server computing system 30 over network 70, stored in the computing device memory 14, and used or otherwise implemented by the one or more processors 12. In some implementations, the computing device 2 can implement multiple parallel instances of a machine-learned model 20. In some embodiments, machine-learned model(s) 20 can perform personalization of one or more content items, or rendering thereof (e.g., surface selection or other rendering characteristics) for or on the client device 102, 2.

Additionally, or alternatively, one or more machine-learned models 40 can be included in or otherwise stored and implemented by the server computing system 30 that communicates with the computing device 2 according to a client-server relationship. For example, the machine-learned models 40 can be implemented by the server computing system 40 as a portion of a web service. For instance, the server computing system 30 can communicate with the computing device 2 over a local intranet or internet connection. For instance, the computing device 2 can be a workstation or endpoint in communication with the server computing system 30, with implementation of the model 40 on the server computing system 30 being remotely performed and an output provided (e.g., cast, streamed, etc.) to the computing device 2. Thus, one or more models 20 can be stored and implemented at the user computing device 2 or one or more models 40 can be stored and implemented at the server computing system 30.

The computing device 2 can also include one or more input components that receive user input. For example, a user input component can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 30 can include one or more processors 32 and a memory 34. The one or more processors 32 can be any suitable processing device (e.g., a processor core, a microprocessor, an ASIC, an FPGA, a controller, a microcontroller, etc.) and can be one processor or a plurality of processors that are operatively connected. The memory 34 can include one or more non-transitory computer-readable storage media, such as RAM, ROM, EEPROM, EPROM, flash memory devices, magnetic disks, etc., and combinations thereof. The memory 34 can store data 36 and instructions 38 which are executed by the processor 32 to cause the server computing system 30 to perform operations.

In some implementations, the server computing system 30 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 30 can store or otherwise include one or more machine-learned models 40. For example, the models 40 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). In some embodiments, machine-learned model(s) 40 can perform personalization of one or more content items, or rendering thereof (e.g., surface selection or other rendering characteristics) for the client device 102, 2.

The computing device 2 or the server computing system 30 can train example embodiments of a machine-learned model (e.g., including models 20 or 40). In some embodiments, the computing device 2 or the server computing system 30 can train example embodiments of a machine-learned model (e.g., including models 20 or 40) via interaction with the training computing system 50. In some embodiments, the training computing system 50 can be communicatively coupled over the network 70. The training computing system 50 can be separate from the server computing system 30 or can be a portion of the server computing system 30.

The training computing system 50 can include one or more processors 52 and a memory 54. The one or more processors 52 can be any suitable processing device (e.g., a processor core, a microprocessor, an ASIC, an FPGA, a controller, a microcontroller, etc.) and can be one processor or a plurality of processors that are operatively connected. The memory 54 can include one or more non-transitory computer-readable storage media, such as RAM, ROM, EEPROM, EPROM, flash memory devices, magnetic disks, etc., and combinations thereof. The memory 54 can store data 56 and instructions 58 which are executed by the processor 52 to cause the training computing system 50 to perform operations. In some implementations, the training computing system 50 includes or is otherwise implemented by one or more server computing devices.

Parameters of the model(s) can be trained, in some embodiments, using various training or learning techniques, such as, for example, backwards propagation of errors. For example, an objective or loss can be backpropagated through pretraining, general training, or finetuning pipeline(s) to update one or more parameters of the model(s) (e.g., based on a gradient of the loss function). Various determinations of loss can be used, such as mean squared error, likelihood loss, cross entropy loss, hinge loss, or various other loss functions. Gradient descent techniques can be used to iteratively update the parameters over a number of training iterations. In some implementations, performing backwards propagation of errors can include performing truncated backpropagation through time. The pipeline(s) can perform a number of generalization techniques (e.g., weight decays, dropouts, etc.) to improve the generalization capability of the models being trained.

The model trainer 60 can include computer logic utilized to provide desired functionality. The model trainer 60 can be implemented in hardware, firmware, or software controlling a general-purpose processor. For example, in some implementations, the model trainer 60 includes program files stored on a storage device, loaded into a memory, and executed by one or more processors. In other implementations, the model trainer 60 includes one or more sets of computer-executable instructions that are stored in a tangible computer-readable storage medium such as RAM, hard disk, or optical or magnetic media.

The network 70 can be any type of communications network, such as a local area network (e.g., intranet), wide area network (e.g., Internet), or some combination thereof and can include any number of wired or wireless links. In general, communication over the network 70 can be carried via any type of wired or wireless connection, using a wide variety of communication protocols (e.g., TCP/IP, HTTP, SMTP, FTP), encodings or formats (e.g., HTML, XML), or protection schemes (e.g., VPN, secure HTTP, SSL).

FIG. 2A illustrates one example computing system that can be used to implement the present disclosure. Other computing systems can be used as well. For example, in some implementations, the computing device 2 can include the model trainer 60. In such implementations, a training pipeline can be used locally at the computing device 2. In some of such implementations, the computing device 2 can implement the model trainer 60 to personalize the model(s) based on device-specific data.

Figure 2B:
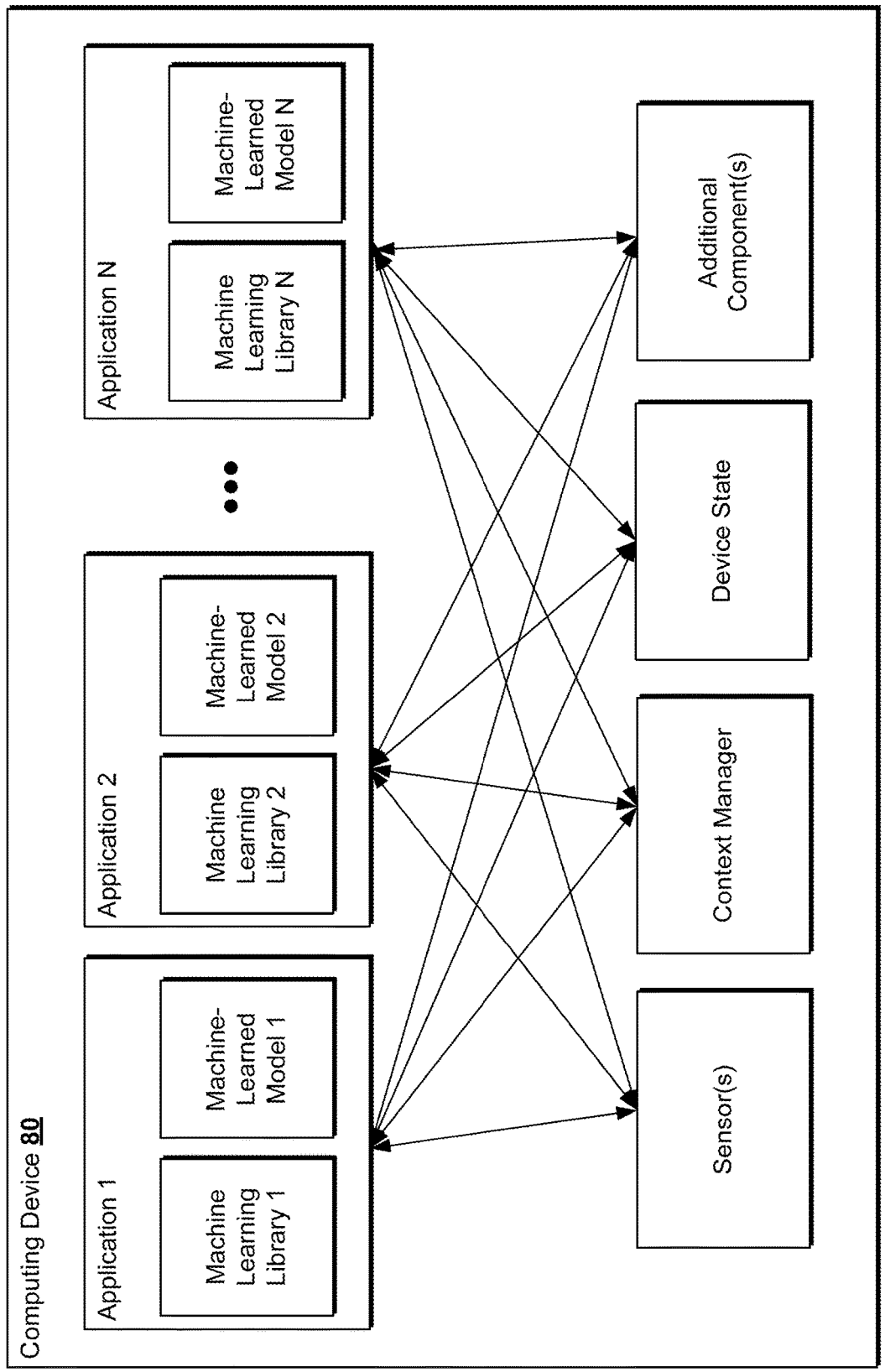
FIG. 2B depicts a block diagram of an example computing device that can perform content retrieval and integration according to example embodiments of the present disclosure.

FIG. 2B depicts a block diagram of an example computing device 80 that performs according to example embodiments of the present disclosure. The computing device 80 can be a user computing device or a server computing device. The computing device 80 can include a number of applications (e.g., applications 1 through N). Each application can contain its own machine learning library and machine-learned model(s). For example, each application can include a machine-learned model. Example applications include a text messaging application, an email application, a dictation application, a virtual keyboard application, a browser application, etc. As illustrated in FIG. 2B, each application can communicate with a number of other components of the computing device, such as, for example, one or more sensors, a context manager, a device state component, or additional components. In some implementations, each application can communicate with each device component using an API (e.g., a public API). In some implementations, the API used by each application is specific to that application.

In some embodiments, each application can respectively generate event occurrence signals (e.g., providing event detection component(s) 106). In some embodiments, each application can be polled by an event detection component 106.

Figure 2C:
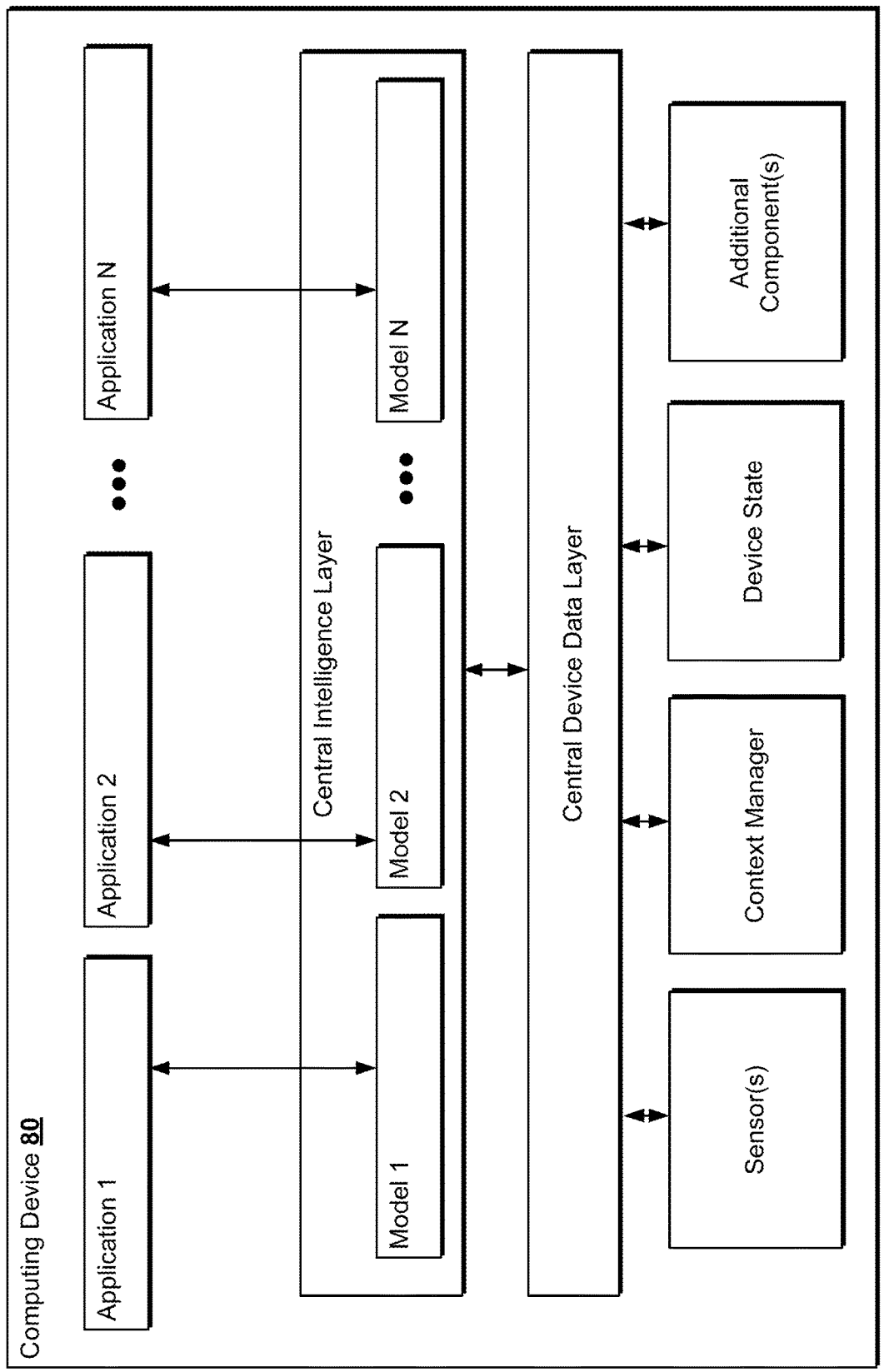
FIG. 2C depicts a block diagram of an example computing device that can perform content retrieval and integration according to example embodiments of the present disclosure.

FIG. 2C depicts a block diagram of an example computing device 80 that performs according to example embodiments of the present disclosure. The computing device 80 can be a user computing device or a server computing device. The computing device 80 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example, as illustrated in FIG. 2C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 80.

The central intelligence layer can communicate with a central device data layer. The central device data layer can be a centralized repository of data for the computing device 80. As illustrated in FIG. 2C, the central device data layer can communicate with a number of other components of the computing device, such as, for example, one or more sensors, a context manager, a device state component, or additional components. In some implementations, the central device data layer can communicate with each device component using an API (e.g., a private API).

Example Methods

Figure 3:
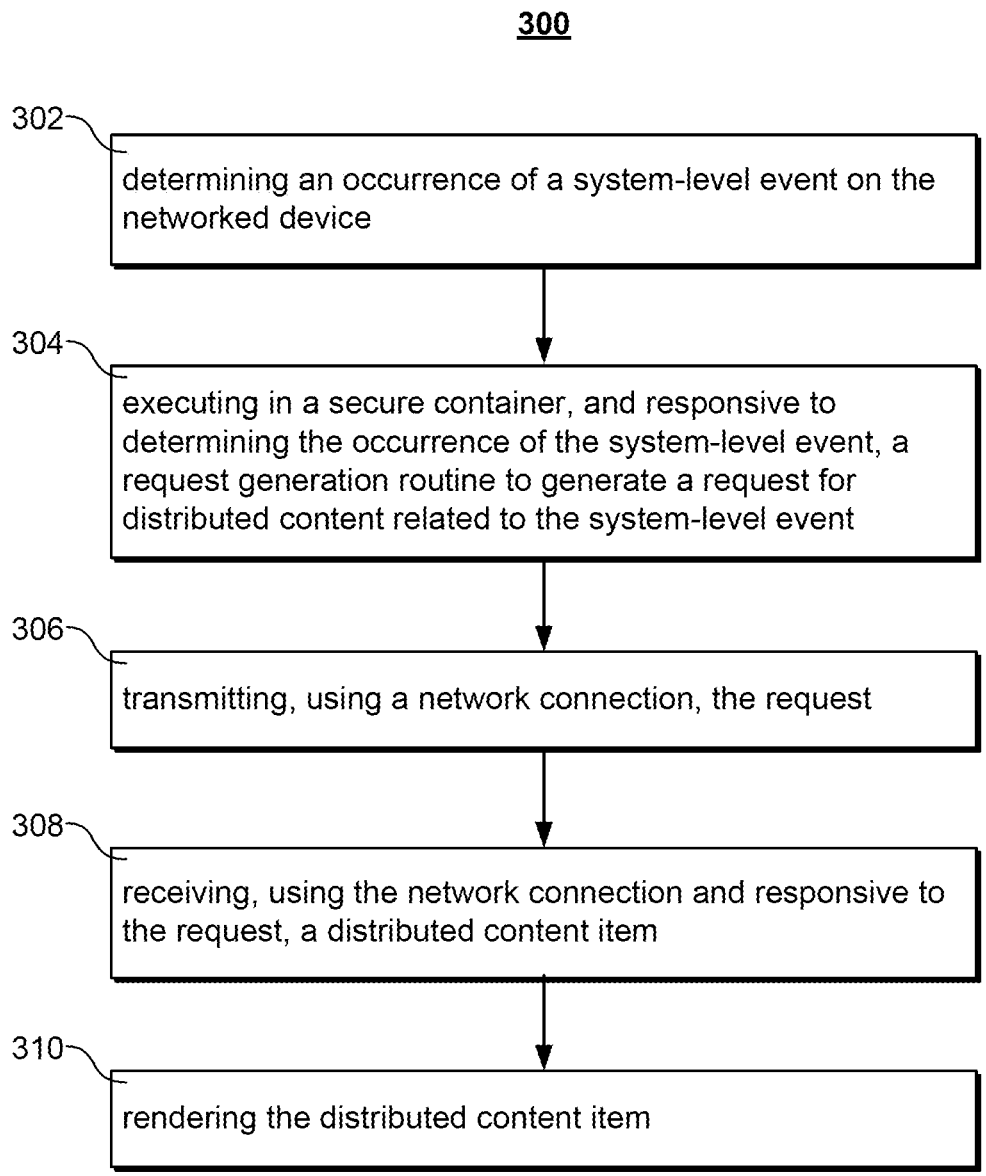
FIG. 3 depicts a flow chart diagram of an example method to perform content retrieval and integration according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system (e.g., a networked device) can perform determining an occurrence of a system-level event on the networked device. For example, the networked device can be a client device 102. A system event can occur on the client device (e.g., battery state drops below threshold; network connection obtained/lost; transmission speed drops below threshold, etc.). For instance, in some embodiments, the system event(s) can include a peripheral connection state.

At 304, the computing system can perform executing in a secure container, and responsive to determining the occurrence of the system-level event, a request generation routine (e.g., executable request generation instructions) to generate a request for distributed content related to the system-level event. For instance, for a low-battery state event, content can be requested to provide information relating to the battery state event. For a network speed threshold event, content can be requested to provide information relating to the network speed threshold event.

At 306, the computing system can perform transmitting, using a network connection, the request. For instance, the request (e.g., request 120) can be directed to one or more server system(s) to obtain content related to the event.

At 308, the computing system can perform receiving, using the network connection and responsive to the request, a distributed content item. For instance, the content item can be downloaded (e.g., to a secure execution environment, such as secure container 108).

At 310, the computing system can perform rendering the distributed content item. For instance, the distributed content item can be rendered in proximity (e.g., temporal, spatial) to native notification element(s) rendered by the system. For instance, in a push notification panel, native notifications can be rendered (e.g., stating "LOW BATTERY") alongside the distributed content item (e.g., stating "Find charging stations near you" with a hyperlink to a network-hosted map of charging resources). For instance, in an audio interface, native notifications can be rendered (e.g., stating "LOW BATTERY") before the distributed content item (e.g., stating "Find charging stations near you" with a follow-on prompt to request a network-hosted map of charging resources on an associated display device). In some embodiments, the distributed content item can be rendered without other native content in the same modality. For instance, a distributed content item can include a jingle or other audio sample retrieved from a server system to play in association with a system event (e.g., for a low battery state, a jingle associated with a provider or charging devices, etc.), while optionally a native display notification appears on a display device. In some embodiments, for instance, an inbound message can be detected by the system and, interfacing through a secured container, a distributed content item can be retrieved and rendered that plays a jingle associated with a messaging service, mail service, etc.

In some embodiments, for instance, a system event includes a peripheral connection state, and a native notification can include a notification element configured to indicate successful connection of the peripheral (e.g., headphones, game controller, etc.). In some embodiments, in the secure container, a distributed content item can be obtained that is descriptive of an action associated with the peripheral (e.g., a link to a music-listening application obtained through a real-time content-selection process, a link to a game application, etc.).

In some embodiments, the computing system renders the distributed content item by driving an audio output to reproduce audible content packaged in the distributed content item In some embodiments, the computing system includes a default audio signal configured for rendering in association with the system-level event, and the audible content can be rendered in substitution for the default audio signal.

In some embodiments, the computing system can be configured to render the default audio signal in the absence of the network connection.

In some embodiments, the secure container is a sandboxed environment restricting access to one or more system-level signals. In some embodiments, the secure container permits execution of the distributed content by one or more of a display driver or an audio driver.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A networked device for securely rendering content items, the networked device comprising:
   one or more processors;
   one or more non-transitory, computer-readable media storing:
      an event detection component configured to access system event information and, responsive to determining occurrence of system-level events, output trigger signals; and
      instructions executable to cause the one or more processors to perform operations, the operations comprising:
         determining, by the event detection component, an occurrence of a system-level event on the networked device;
         outputting, by the event detection component, a trigger signal associated with the system-level event;
         responsive to the trigger signal, executing, in a container, a request generation routine to generate a request for distributed content related to the system-level event, wherein the container is a sandboxed environment restricting access to the system event information;
         transmitting, using a network connection, the request;
         receiving, responsive to the request and using the network connection, a content item; and
         rendering the content item.

2. The networked device of claim 1, wherein the networked device renders the content item on a display, the distributed content rendered within a graphical user interface in association with a system-level notification corresponding to the system-level event.

3. The networked device of claim 1, wherein the networked device renders the content item by driving an audio output to reproduce audible content packaged in the content item.

4. The networked device of claim 3, wherein the networked device comprises a default audio signal configured for rendering in association with the system-level event, and wherein the audible content is rendered in substitution for the default audio signal.

5. The networked device of claim 4, wherein the networked device is configured to render the default audio signal in the absence of the network connection.

6. The networked device of claim 1, wherein the container permits execution of the distributed content by one or more of a display driver or an audio driver.

7. The networked device of claim 6, wherein the container prohibits access between the distributed content and other system libraries.

8. The networked device of claim 1, wherein the system-level event comprises a state change of a component of the networked device.

9. The networked device of claim 8, wherein the state change comprises a battery charge level change, a network connection change, or an unused storage capacity change.

10. The networked device of claim 1, wherein the request generation routine is provided, through an interface of the container, with an input descriptive of the system-level event.

11. The networked device of claim 1, wherein the container is configured for rendering content in association with a type of system-level event by passing only signals associated with that type of system-level event.

12. A computer-implemented method for securely rendering content items, the method comprising:
  determining, by a computing system comprising one or more processors, using an event detection component configured to access system event information and, responsive to determining occurrence of system-level events, output trigger signals, an occurrence of a system-level event on a networked device;
  outputting, by the computing system using the event detection component, a trigger signal associated with the system-level event;
  executing, by the computing system, in a container, and responsive to the trigger signal, a request generation routine to generate a request for distributed content related to the system-level event, wherein the container is a sandboxed environment restricting access to the system event information;
  transmitting, by the computing system and using a network connection, the request;
  receiving, by the computing system, using the network connection, and responsive to the request, a content item; and
  rendering, by the computing system, the content item.

13. The computer-implemented method of claim 12, wherein the distributed content is rendered within a graphical user interface in association with a system-level notification corresponding to the system-level event.

14. The computer-implemented method of claim 12, wherein the computing system renders the content item by driving an audio output to reproduce audible content packaged in the content item.

15. The computer-implemented method of claim 14, wherein the computing system comprises a default audio signal configured for rendering in association with the system-level event, and wherein the audible content is rendered in substitution for the default audio signal.

16. The computer-implemented method of claim 15, wherein the computing system is configured to render the default audio signal in the absence of the network connection.

17. The computer-implemented method of claim 12, wherein the container permits execution of the distributed content by one or more of a display driver or an audio driver.

18. A computing system for securely rendering content items, the computing system comprising:
  one or more processors;
  one or more non-transitory, computer-readable media storing instructions executable to cause the one or more processors to perform operations, the operations comprising:
    receiving a request for a distributed content item, the request generated within a container of a client device responsive to a trigger signal associated with an occurrence of a system-level event on the client device, the trigger signal generated by an event detection component configured to access system event information of the client device and, responsive to determining occurrence of system-level events, output trigger signals, wherein the container is a sandboxed environment restricting access to the system event information of the client device;
    determining, based on the request, a type of event associated with the request;
    determining, based on the type of event, a content item; and
    outputting the content item for rendering on the client device.

19. The computing system of claim 18, wherein the operations comprise:
  rendering the distributed content item by driving an audio output to reproduce audible content packaged in the distributed content item.

20. The computing system of claim 19, wherein the one or more non-transitory, computer-readable media store a default audio signal configured for rendering in association with the event, and wherein the audible content is rendered in substitution for the default audio signal.

* * * * *